(12) United States Patent
Cook et al.

(10) Patent No.: US 9,179,162 B2
(45) Date of Patent: Nov. 3, 2015

(54) IMAGE TRANSFORM ZERO COEFFICIENT SELECTION AND ZERO-SKIP TRANSMISSION FOR ARBITRARY SHAPE TRANSFORM CODING

(75) Inventors: Gregory W. Cook, San Jose, CA (US); Antonius Kalker, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 606 days.

(21) Appl. No.: 13/495,864

(22) Filed: Jun. 13, 2012

(65) Prior Publication Data

US 2013/0142248 A1 Jun. 6, 2013

Related U.S. Application Data

(60) Provisional application No. 61/566,102, filed on Dec. 2, 2011.

(51) Int. Cl.
*H04N 7/12* (2006.01)
*H04N 19/60* (2014.01)
*H04N 19/21* (2014.01)
*H04N 19/625* (2014.01)

(52) U.S. Cl.
CPC ............. *H04N 19/649* (2014.11); *H04N 19/21* (2014.11); *H04N 19/625* (2014.11)

(58) Field of Classification Search
CPC ..................................................... H04N 19/00
USPC ........................................................ 375/240
See application file for complete search history.

(56) References Cited

U.S. PATENT DOCUMENTS 5,990,956 A 11/1999 Lee

FOREIGN PATENT DOCUMENTS

| CN | 1187737 A | | 7/1998 | |
|---|---|---|---|---|
| EP | 1021043 A2 | | 7/2000 | |
| KR | EP 1021043 | * | 7/2000 | ............. H04N 19/00 |

OTHER PUBLICATIONS

Shen, "Arbitrarily Shaped Transform Coding Based on a New Padding Technique", IEEE Transactions on Circuits and Systems for Video Technology, vol. 11, No. 1, Jan. 2001.*
ISO/IEC 14496-2:2001(E), Information Technology-Coding of Audio-Visual Objects-Part 2: Visual.*
Foreign Communication From A Counterpart Application, PCT Application PCT/CN2012/085746, International Search Report dated Mar. 14, 2013, 6 pages.

(Continued)

*Primary Examiner* — Gims Philippe
*Assistant Examiner* — Kyle Lotfi
(74) *Attorney, Agent, or Firm* — Conley Rose, P.C.; Grant Rodolph; William H. Dietrich

(57) ABSTRACT

To encode an arbitrary shape, a processor is configured to generate a rectangular block of transform coefficients by applying a discrete separable unitary transform to a rectangular boundary block of a video object. The boundary block includes a masked pixel and an unmasked pixel, the transform coefficients include a number of zero-valued transform coefficients greater than or equal to a number of masked pixels, and the transform coefficients include at least one non-zero-valued transform coefficient. The processor is also configured to generate an encoded output by compressing only the non-zero-valued transform coefficients.

28 Claims, 11 Drawing Sheets

(56) References Cited

OTHER PUBLICATIONS

Foreign Communication From A Counterpart Application, PCT Application PCT/CN2012/085746, Written Opinion dated Mar. 14, 2013, 4 pages.

Guobin, S., et al., "Arbitrarily Shaped Transform Coding Based on a New Padding Technique," IEEE Transactions on Circuits and Systems for Video Technology, vol. 11, Issue 1, Jan. 31, 2001, pp. 67-79.

"Information Technology—Coding of Audio-Visual Objects—Part 2: Visual," ISO/IEC 14496-2 International Standard, Dec. 1, 2001, 536 pages.

Chen, H., et al., "A Block Transform Coder for Arbitrarily Shaped Image Segments," Proceedings of the 1994 IEEE International Conference on Image Processing, Austin, Texas, Nov. 13-16, 1994, pp. 85-99.

Higuchi, Y., et al., "Arbitrarily Shaped Transform Coding Based on Modification of Pixels in Shapes," Proceedings of 2009 APSIPA Annual Summit and Conference, Sapporo, Japan, Oct. 4-7, 2009, pp. 833-836.

Shen, G., et al., "Arbitrarily Shaped Transform Coding Based on a New Padding Technique," IEEE Transactions on Circuits and Systems for Video Technology, vol. 11, No. 1, Jan. 2001, pp. 69-79.

Sikora, T., et al., "Shape-Adaptive DCT for Generic Coding of Video," IEEE Transactions on Circuit and Systems for Video Technology, vol. 5, No. 1, Feb. 1995, pp. 59-62.

Sikora, T., et al., "Efficiency of Shape Adaptive 2-D Transform for Coding of Arbitrary Shaped Image Segments," IEEE Transactions on Circuits and Systems for Video Technology, vol. 5, No. 3, Jun. 1995, pp. 254-258.

Stasinski, R., et al., "A New Class of Fast Shape-Adaptive Orthogonal Transforms and Their Application to region-Based Image Compression," IEEE Transactions on Circuits and Systems for Video Technology, vol. 9, No. 1, Feb. 1999, pp. 16-34.

Strang, G., et al., "Linear Algebra and Its Applications: Third Edition," Harcourt Brace Jovanovich, Feb. 1988, p. 236.

\* cited by examiner

IMAGE TRANSFORM ZERO COEFFICIENT SELECTION AND ZERO-SKIP TRANSMISSION FOR ARBITRARY SHAPE TRANSFORM CODING

CROSS-REFERENCE TO RELATED APPLICATIONS

The present application claims priority to U.S. Provisional Patent Application No. 61/566,102 filed Dec. 2, 2011 by Gregory W. Cook et al and entitled "Discrete Cosine Transform Zero Coefficient Selection and Zero-skip Zigzag for Arbitrary Shape Transform Coding", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. Due to limited network resources, improved compression and decompression techniques that increase compression ratios without substantially reducing image quality are desirable.

SUMMARY

In one embodiment, the disclosure includes an apparatus comprising a processor configured to generate a rectangular block of transform coefficients comprising applying a discrete separable unitary transform to a rectangular boundary block of a video object, wherein the boundary block comprises at least one masked pixel and at least one unmasked pixel, wherein the transform coefficients comprise a number of zero-valued transform coefficients greater than or equal to a number of masked pixels, wherein the transform coefficients comprise at least one non-zero-valued transform coefficient; and generate an encoded output comprising compressing only the non-zero-valued transform coefficients.

In another embodiment, the disclosure includes a method comprising generating a rectangular block of transform coefficients comprising applying a discrete separable unitary transform to a rectangular boundary block of a video object, wherein the boundary block comprises at least one masked pixel and at least one unmasked pixel, wherein the transform coefficients comprise a number of zero-valued transform coefficients greater than or equal to a number of masked pixels, and wherein the transform coefficients comprise at least one non-zero-valued transform coefficient; and generating an encoded output comprising compressing only the non-zero-valued transform coefficients.

In yet another embodiment, the disclosure includes an apparatus for encoding a rectangular boundary block of a video object, wherein the boundary block comprises a plurality of pixels, wherein at least one pixel is a masked pixel and at least one pixel is an unmasked pixel, the apparatus comprising a processor configured to, for each of a plurality of sets of pixels of the boundary block, assign a discrete cosine transform (DCT) coefficient a value of zero if the masked and unmasked pixels in a set are arranged in one of a plurality of predefined orders, and otherwise perform a one-dimensional (1D) DCT on the set to generate a non-zero-valued DCT coefficient; and generate an encoded output comprising compressing only the non-zero-valued DCT coefficients, wherein a number of non-zero-valued DCT coefficients is equal to a number of unmasked pixels in the boundary block, and wherein a number of zero-valued DCT coefficients is equal to a number of masked pixels in the boundary block.

In yet another embodiment, the disclosure includes an apparatus comprising a receiver configured to receive a video stream comprising a group of encoded discrete cosine transform (DCT) coefficients corresponding to a rectangular boundary block of a video object, wherein the video stream further comprises a binary mask of the boundary block; and a processor configured to decode the group to generate a plurality of DCT coefficients; arrange the DCT coefficients together with zero-valued coefficients into a rectangular DCT block, wherein the rectangular DCT block comprises a number of zero-valued coefficients greater than or equal to a number of masked pixels indicated by the binary mask, and wherein a position of at least one zero-valued coefficient is based on a position of at least one masked pixel indicated by the binary mask; and generate an estimate of the boundary block comprising performing an inverse DCT on the rectangular DCT block.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
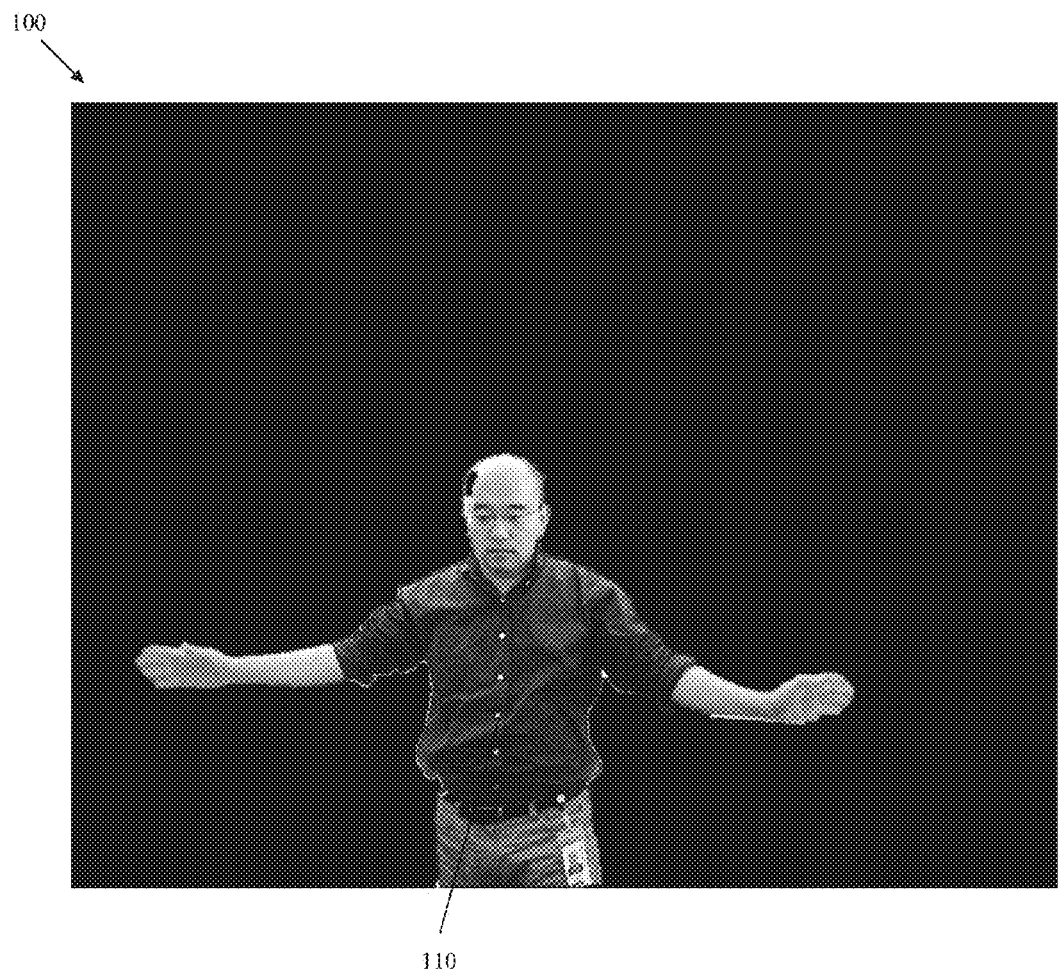
FIG. 1 is an image of an examplary standard video frame.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. Usually, a video frame may be broken into a plurality of blocks (or macroblocks), and a typical N×N block may comprise $N^2$ pixels, where N is an integer greater than one. Each block may serve as a basic unit for the purpose of motion compensation or performing a two-dimensional (2D) orthogonal transform. Various types of unitary transforms may be used in video compression, such as Discrete Cosine Transform (DCT), Fractal Transform (FT), Vector Quantization (VQ), and Discrete Wavelet Transform (DWT) (it is well known a transform is unitary if the inverse of a matrix representing the transform is equal to its conjugate transpose). For example, the popular DCT may transform the luminance and/or chrominance values of the pixels in a block from a spatial domain to a frequency domain. In use, the DCT may operate on a block comprising $N^2$ input pixels and yield a block (or matrix) comprising $N^2$ output coefficients in a frequency domain. It is well known that a 2D DCT may be separated into two one-dimensional (1D) DCT operations (i.e., the 2D DCT is separable), in which a first 1D DCT may be performed in a direction orthogonal to a second 1D DCT. For example, the first 1D DCT may be applied to each row of the block, and then the second 1D DCT may be applied to each column of the result of the first 1D DCT.

A DCT block may comprise low-frequency coefficients located in the upper left corner (with low indices or indexes) and high-frequency coefficients in the lower right corner (with high indices). It has been observed that human eyes are more sensitive to the information contained in the low-frequency coefficients (corresponding to large features) than to the information contained in the high-frequency coefficients (corresponding to small features). Thus, the high-frequency coefficients may be filtered in a quantization step, so that the encoded data amount may be significantly reduced without notably degrading image quality. As a result of the filtering, zero-valued (or near zero-valued) coefficients may cluster in the lower right corner. All coefficients may be scanned following a pre-defined order (e.g., a zigzag or raster order), which start may from the upper left corner. For example, in the zigzag order, an end of block (EOB) signal may be generated to indicate the position of the last non-zero coefficient. Then, the coefficients before and at the EOB position may be encoded one-by-one following, for example, the same zigzag order. The zero coefficients after the EOB position may be skipped in the encoding process. Thus, for a N×N DCT block, the number of encoded coefficients may be less than $N^2$, leading to higher coding efficiency and energy compaction.

Within a rectangular video frame, a video object may refer to an arbitrarily shaped region of interest. In practice, the video object may often comprise a plurality of pixels representing, for example, a human subject (also referred to as a foreground) separated from a surrounding environment (also referred to as a background). In modern video communication systems, transform coding of an arbitrary shape (e.g., a video object) has become increasingly important, as image sensing techniques are allowing fast and accurate real-time video target segmentation to become a reality. As a result, it may be relatively easy now to encode and decode a video object instead of an entire video frame. The encoded segmented video object may be transmitted over a network without its background information, which may lead to significant saving of transmission bit rates.

Arbitrary shape transform coding may involve two rectangular frames—a first standard video frame and a corresponding second binary mask frame. FIG. 1 shows an image of an examplary standard video frame 100 comprising a video object 110. The standard video frame 100 may be processed from a raw frame captured by a video camera. The standard video frame 100 may contain color pixels of the video object 110. However, since no background may be needed in video transmission, the video frame 100 may contain no color information of the background. In fact, any pixel not belonging to the video object 110 may be configured to have any convenient color value (e.g., zero luminance and chrominance value shown in black). For illustrative purpose herein, the video object 110 comprises a human subject. Depending on application, the video object 110 may refer to an arbitrarily shaped image region comprising any content of interest. For example, the video object 110 may comprise a plurality of humans, an animal, a machine, and so forth. Pixels of the video object 110 may also be referred to herein as unmasked pixels, and all other pixels may be referred to as masked pixels.

Figure 2:
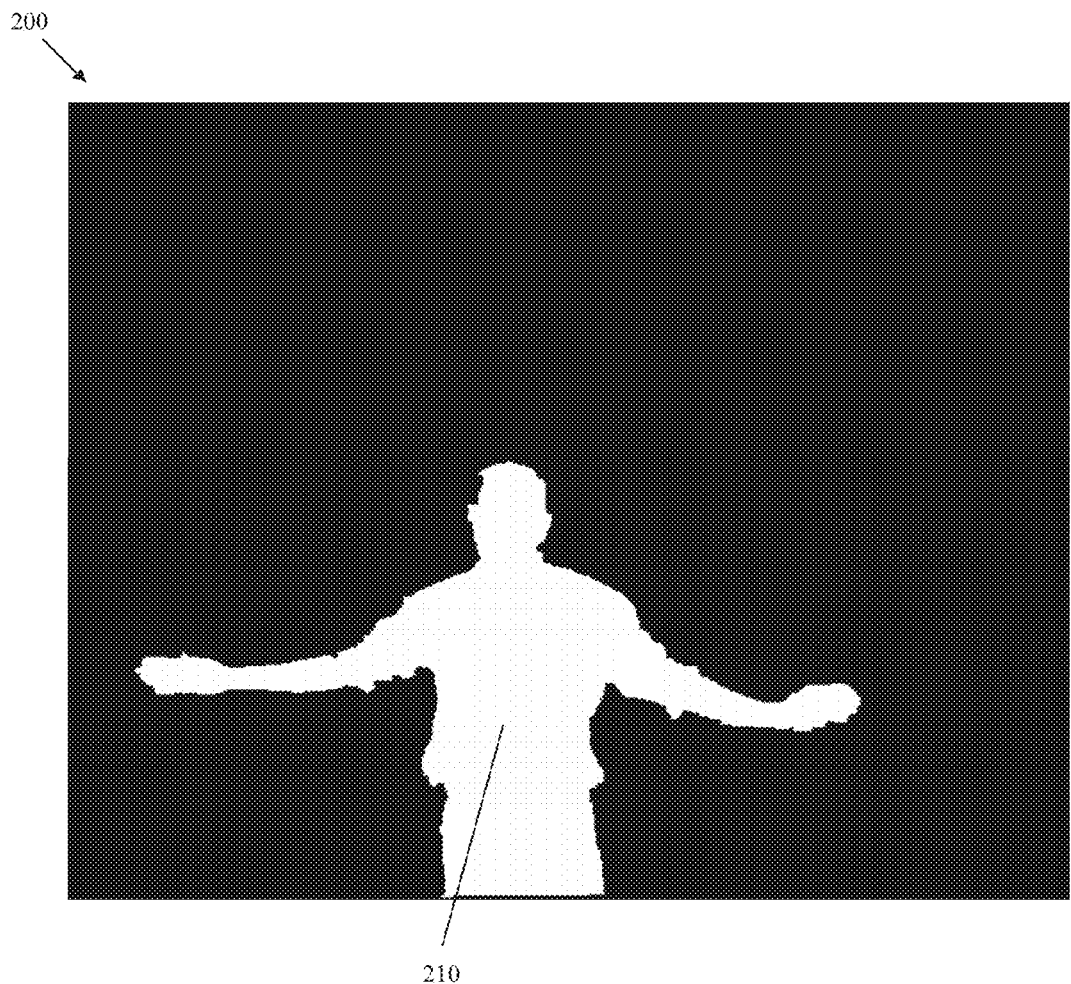
FIG. 2 is an image of an examplary binary mask.

FIG. 2 shows an image of an examplary binary mask 200 corresponding to the standard video frame 100. The binary mask 200 may be a rectangular frame comprising a plurality of binary data points (e.g., 1s and 0s). For the purpose of illustration, in FIG. 2 all 1-valued data points are shown in a white region 210 and all 0-valued data points are shown in a black region. A data point at a given location within the binary mask 200 may correspond to a color pixel at the same location in the standard video frame 100. Thus, a 1-valued data point in the region 210 may indicate that its corresponding pixel belongs to the video object 110, and a 0-valued data point may indicate that its corresponding pixel does not belong to the video object 110. In use, the binary mask 200 may be encoded independently before the video object 110, so its data points may provide a location reference for all the color pixels of the video object 110. This location reference may prove important in the encoding and decoding of the video object 110. For example, during the DCT process, sometimes the locations of pixels in the boundary area of the video object 110 may be rearranged (in a pre-defined pattern) to achieve better coding efficiency. In this case, during the inverse DCT (IDCT) process, the binary mask 200 as well as information of the pre-defined pattern may be used to retrieve the original locations of rearranged pixels, which may be necessary for correct video display.

Figure 3:
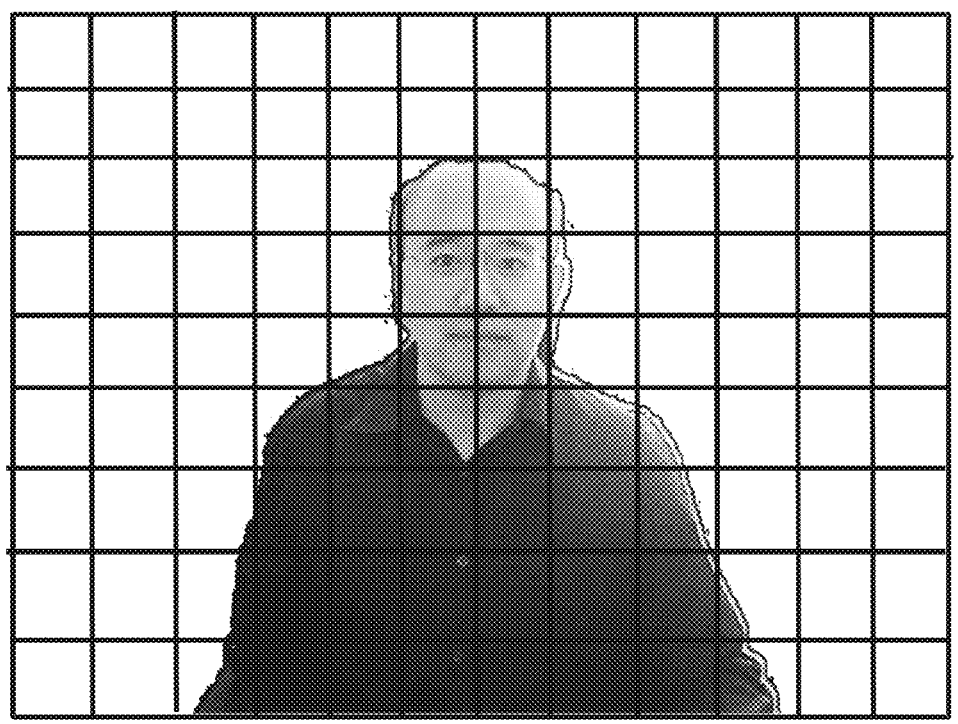
FIG. 3 is a schematic diagram of a video frame block partition.

An image or video frame may comprise a large amount of color pixels (e.g., 2,073,600 pixels in a 1920×1080 frame), thus it may be cumbersome and inefficient to encode and decode each pixel independently. To improve coding efficiency, a video frame is usually broken into a plurality of blocks. FIG. 3 shows a schematic diagram of a video frame block partition 300. The video frame block partition 300 may comprise a plurality of rectangular blocks, which may be square or non-square. A typical square block may comprise N×N pixels, where N is an integer greater than one. In the encoding and decoding processes of the video frame block partition 300, each block may serve as a basic unit of motion compensation and/or two-dimensional orthogonal transform, such as the DCT. As shown in FIG. 3, the video frame block partition 300 may contain only pixels of a video object and no pixels of a background, as the background information may not be needed in an arbitrary transform coding scheme. The video frame block partition 300 may be applied onto any frame. For example, both a standard video frame, such as the standard video frame 100 in FIG. 1, and its corresponding binary mask, such as the binary mask 200 in FIG. 2, may be configured to have the same block partition.

For proper storage, transmission and/or display of a video frame, encoding and decoding processes may be required. Encoding and decoding may also be referred to simply as coding. In practice, the following coding procedure may be used. Consider, for example, the encoding of a current block in a video frame (e.g., the video frame in FIG. 3). Firstly, an intra difference of the current block (based on certain pixels in surrounding blocks) or an inter difference of the current block (based on a block at the same location in previous frames) may be analyzed. A prediction mode (intra coding) and/or motion vector (inter coding) may be generated accordingly. Secondly, a 2D DCT (or two 1D DCTs) may be performed on the current block which may be an intra or inter-coded block, generating a DCT block comprising frequency-domain coefficients. Typically, the strong coefficients may have low indices, and the weak coefficients may have high indices. Thirdly, the coefficients may be quantized, which may filter the high-indice coefficients more heavily, thus leading to loss of high frequency information. Fourthly, all coefficients in the DCT block may be pre-scanned following a pre-defined linear order (e.g., a zigzag or raster order), and certain features of the block (e.g., the EOB position) may be determined. Fifthly, depending on the EOB, all or a portion of the DCT coefficients may be encoded into a compressed format using an entropy encoder (e.g., an arithmetic encoder) following, for example, the zigzag order. Zero coefficients after the EOB position may be skipped in the encoding. After the execution of the five steps above, the encoded DCT coefficients may be stored and/or transmitted over a network. Likewise, a decoder may perform the steps above in a reversed order, and generate a pixel block which may be a same or an approximate version of the original block.

Figure 4:
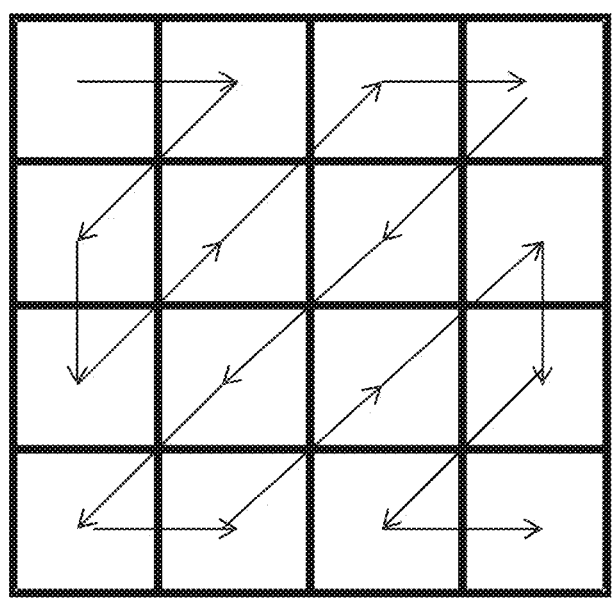
FIG. 4 is a schematic diagram of a zigzag order.

In the fourth and fifth steps above, the coefficients of a DCT block may be pre-scanned and encoded following the same pre-defined order. Among the variety of pre-defined orders used in the multimedia field, a popular one may be the zigzag order. FIG. 4 shows a schematic diagram of a zigzag order 400. Suppose, for the purpose of illustration, that the DCT block has a size of 4×4, and has coefficient indexes ranging from (0, 0) (in the upper left corner) to (3, 3) (in the lower right corner). Note that the zigzag order 400 may be applicable to any suitable size of block. The zigzag encoding order 400 may start from a coefficient at the most upper left position (e.g., with index (0, 0)), and progress through all coefficients one-by-one (following the order illustrated in FIG. 4) until the most lower right coefficient (e.g., with index (3, 3)). An EOB symbol may be generated to signal the position of the last non-zero coefficients in the zigzag order 400. If no zero coefficient is present in the DCT block, then no EOB symbol may be needed. In the next encoding step following the completion of pre-scanning, the zigzag order 400 may also be employed. The encoding may include only coefficients before or at the EOB position following the zigzag order 400. It should be noted that although the zigzag order 400 may eliminate all zero coefficients after the EOB position from encoding, it may not detect any potential zero coefficients before the EOB position. One or more zero coefficients before the EOB position, if present, may still be coded, which may lead to limited coding efficiency.

As mentioned previously, a video object may be coded and transmitted without its background. In practice, however, there still exist technical difficulties. Since a video object (e.g., the video object 110 in FIG. 1) may be an arbitrarily shaped region in a video frame, its boundary may not correspond to square blocks, which may be required for standard block-based transforms (e.g., DCT). The standard transforms may be a critical step in the compression of the video object, therefore effective and efficient coding of the boundary area may be important, according to an article entitled "A Block Transform Coder for Arbitrarily Shaped Image Segments," by H. Chen, M. Civanlar, and B. Haskell in *Proceedings of the 1994 IEEE International Conference on Image Processing*, Austin, Tex., USA, Nov. 13-16, 1994, pp. 85-99, which is hereby incorporated by reference.

Figure 5:
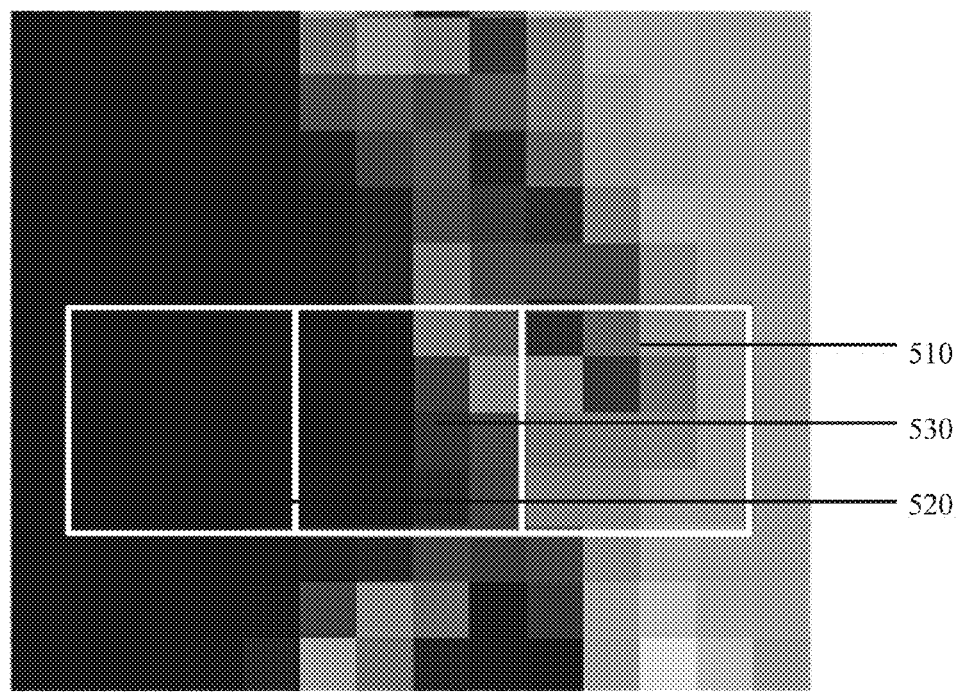
FIG. 5 is an image of an examplary boundary area of a video object.

FIG. 5 shows an image of an examplary boundary area 500 of a video object. The boundary area 500 may comprise a plurality of blocks categorized into three different types. An example of each type of block includes an interior block 510, an external block 520, and a boundary block 530. For the purpose of illustration herein, each block has the size of 4×4 comprising 16 pixels. In the present disclosure, the interior block 510 may refer to a block containing exclusively pixels belonging to the video object. The interior block 510 may typically yield a DCT block including no zero coefficients, therefore the interior block 510 may be encoded following the conventional procedure as outlined above. Similarly, the exterior block 520 may refer to a block containing no pixels belonging to a video object. The exterior block 520 may be completely masked, therefore its pixels may be assigned with any convenient values. In use, the exterior block 520 may not be included in an arbitrary shape transform coding scheme, which may only contain pixels of the video object.

The boundary block 530 may refer to a block comprising at least one video object pixel (i.e., unmasked pixel) and at least one background pixel (i.e., masked pixel). In an arbitrary shape transform coding scheme, the boundary block 530 may be an irregularly shaped (or non-rectangular) block without padding or assignment of masked pixel values. Therefore, 2D standard transforms, such as DCT, may not be performed on the boundary block as is. To enable 2D transforms, the one or more masked pixels in the boundary block 530 may be assigned with arbitrary values. The assignment of values to masked pixels and/or the rearrangement of pixel locations may also be referred to herein simply as padding.

In multimedia systems where object-based coding is used, the coding of boundary blocks may be critical. Currently, a variety of methods regarding the coding of boundary blocks may be available. However, there are potential problems and/or limitations associated with current methods. For example, in one padding method the values of all masked pixels are simply assumed to be zero. However, this assumption may lead to poor coding efficiency in terms of rate-distortion (RD) cost, according to an article entitled "A New Class of Fast Shaped-Adaptive Orthogonal Transforms and Their Application to Region-Based Image Compression," by R. Stasinski and J. Konrad in *IEEE Transactions on Circuits and Systems* for *Video Technology*, vol. 9, no. 1, pp. 16-34, 1999, which is hereby incorporated by reference.

Other padding methods have also been used to modify values of masked and/or unmasked pixels of a boundary block, so that zero coefficients may have the highest indices in the DCT block, according to articles entitled "Arbitrarily Shaped Transform Coding Based on a New Padding Technique," by G. Shen, B. Zeng, and M. L. Liou in *IEEE Transactions on Circuits and Systems for Video Technology*, vol. 11, no. 1, pp. 67-78, 2001, and "Arbitrarily Shaped Transform Coding Based on Modification of Pixels in Shapes," by Y. Higuchi and Y. Kuroki in *Proceedings of the 2009 Asia Pacific Signal and Information Processing Association (APSIPA) Annual Summit and Conference*, Sapporo, Japan, Oct. 4-7, 2009, pp. 833-836, both of which are hereby incorporated by reference. In this case, the conventional zigzag encoding algorithm may be relatively effective, since the zero coefficients may be typically at positions after the EOB symbol.

However, the effectiveness of the padding methods mentioned above may be decreased, when the zero coefficients are skewed to one side or the other of the DCT block. This may be the case, for example, when performing DCT for certain boundary blocks (e.g., boundary blocks of an oddly shaped video object). Zero (or near zero) coefficients in the DCT block may be randomly scattered or skewed, instead of clustering in the lower right corner. Consequently, following a conventional zigzag order (e.g., the zigzag order 400), one or more zero-valued coefficients (hereinafter, zero coefficients) before the EBO position may be coded. Since the zero coefficients may be perceptually insignificant, their processing may consume unnecessary power and time which lowers coding efficiency. Thus, a method of skipping all zero coefficients, regardless of their position in the DCT block, may be desirable to improve coding efficiency.

In addition, current padding techniques may usually be executed in two orthogonal directions (e.g., horizontally and vertically) to test whether starting encoding in a certain direction may yield higher coding efficiency. The double-direction execution may result in doubling of the number of computations, which lowers coding efficiency. Further, in current padding schemes, the masked and/or unmasked pixel may be quantized to generate zero coefficients. The input pixels may also be heavily filtered to provide sufficient degrees of freedom. Although energy compaction may be improved, the quantization and/or heavy filtering may lead to significant loss of information. Thus, a method of generating more zero coefficients without information loss may be desirable to improve energy compaction.

Disclosed herein are systems and methods for improving the coding efficiency of boundary blocks of a video object, which comprises both masked and unmasked pixels. The disclosed systems and methods comprise at least one of the following aspects. In a first aspect, a block on a binary mask corresponding to the boundary block of the video object may be used to determine the number of masked pixels in a considered row (or column) of the boundary block. Depending on the number of masked pixels, a padding scheme may assign values to the masked pixels, as well as rearrange the locations of the masked and/or unmasked pixels following a variety of pre-defined patterns. As a result, zero coefficients may be generated in certain known positions of the DCT block. The number of zero coefficients may be equal to the number of masked pixels in the boundary block. In a second aspect, all zero coefficients with known positions, regardless of their position with respect to the EOB symbol, may be skipped in the encoding and decoding processes. The reduction in the number of coefficients being encoded and/or decoded may lead to higher coding efficiency and energy compaction. In the disclosure, there may be no need to compute extra information beyond what is needed for the DCT transform itself, and no need to signal any information about the zigzag order. As a result, there may be automatic compensation for oddly shaped video objects. The disclosed systems and methods may efficiently encode and/or decode boundary blocks and thus allow greater freedom in determining the optimum non-video object pixels before compression. In addition, the disclosed systems and methods may be implemented using low complexity algorithms, which may improve the processing efficiency when coding boundary blocks.

Figure 6:
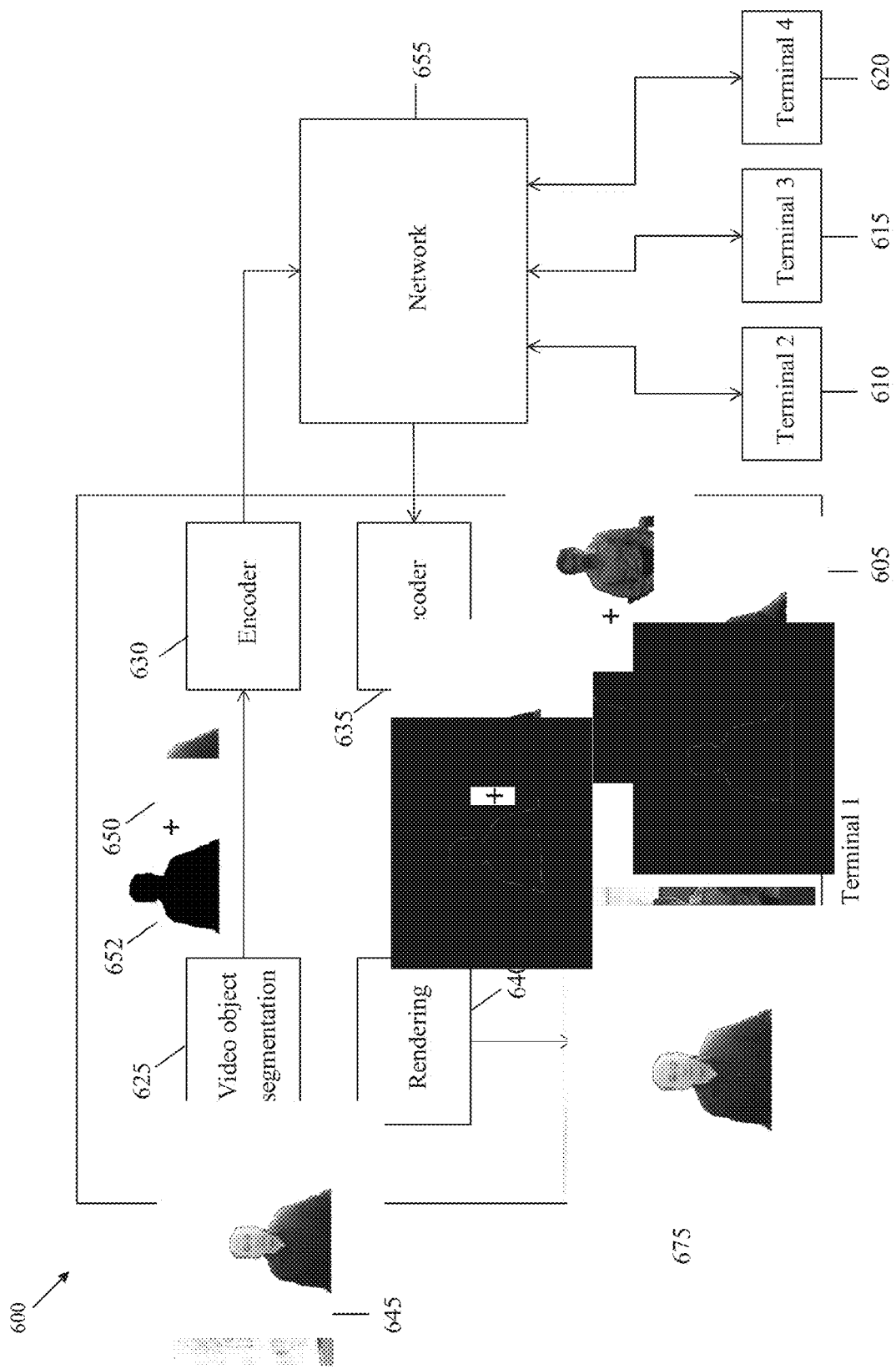
FIG. 6 is a schematic diagram of an embodiment of a video communication system.

FIG. 6 shows a schematic diagram of an embodiment of a video communication system 600. A plurality of video objects may be processed, transmitted, and displayed in the video communication system 600, which may employ a network architecture based on a peer-to-peer (as illustrated in FIG. 6) or a client-server model. Suppose, for the purpose of illustration, that the video communication system 600 comprises four terminals 605, 610, 615 and 620. In practice, any number of terminals may be included. A user at each terminal may be communicating with each other from remote sites (e.g., participating in a video conference).

Take the end of the terminal 605 as an example, with the premise that descriptions regarding the terminal 605 may be equally applicable to any other terminal. The terminal 605 comprises a video object segmentation module 625, an encoder 630, a decoder 635, and a rendering module 640 arranged as shown in FIG. 6. In an embodiment, the terminal 605 may use an arbitrary shape transform coding scheme. In the terminal 605, a video camera may capture a sequence of video frames including a video frame 645. Since only a video object 650 may be needed instead of the entire video frame 645, the video object segmentation module 625 may extract the video object 650. The video object segmentation module 625 may use any known segmentation technique. The video object segmentation module 625 may also generate a binary mask (or shape) 652 corresponding to the video object 650. Both the video object 650 and its corresponding binary mask 652 may then feed into the encoder 630. The encoder 630 may receive uncompressed video signals and produce compressed video signals. One or more aspects of the disclosed systems and methods may be implemented in the encoder 630. For example, the encoder 630 may divide the video object 650 into a plurality of blocks, on which DCT may be performed. Using the binary mask 652 as a reference, masked and/or unmasked may be modified and rearranged to generate zero coefficients at known positions. The zero coefficients may then be skipped in the zigzag encoding order, which is fulfilled by the encoder 630. Encoding may also be referred to herein as compression, and decoding may be referred to as decompression.

In the video communication system 600, video bitstreams compressed by the encoder 630, comprising the video object 650 and the binary mask 652, may be transmitted from the terminal 605 via a network 655 and received by other terminals 610-620. In a same or similar manner, bitstreams from any of the other terminals 610-620 may also be transmitted via the network 655 and received by the terminal 605. Such a peer-to-peer network architecture does not require a centralized server for receiving and processing all video signals from all terminals. The network 655 may be any combination of routers and other processing equipment necessary to transmit video signals between each of terminals 605-620. The network 655 may be, for example, the public Internet or a local Ethernet network. The terminals 605-620 may be connected to the network 655 via wired or wireless links.

One or more bitstreams comprising video objects and corresponding binary masks may be transmitted from the other terminals 610-620 and received by the decoder 635 in the terminal 605. Upon receiving of bitstreams, the decoder 635 may perform the inverse of the encoder 630. One or more aspects of the disclosed systems and methods may be implemented in the decoder 635. For example, the decoder 635 may decompress encoded non-zero coefficients and fill them into positions of a DCT block. Certain positions in the DCT block may be assigned zero coefficients, based on a corresponding binary mask. The IDCT may also be performed in the decoder 635. In order to retrieve original locations of pixels of video objects (e.g., the video object 650), during IDCT, corresponding binary masks (e.g., the binary mask 652), may be used. The decoder 635 may generate video objects in their uncompressed forms. The rendering module 640 may then combine all sequences of decoded video objects and generate a video display signal comprising a common sequence of video frames including a video frame 675. The rendering module 640 may display each video object in separate video sequences, or alternatively may display some or all of the video objects in a common video sequence. A background may also be added to video frame 675 to create the appearance of having all users situated in the same environment. If desired, different backgrounds may be added to different displayed video sequences.

Alternatively, the video communication system 600 may employ a client-server network architecture to facilitate video communications among a plurality of terminals. In this case, each terminal may be connected to a server via a network. Compared with a peer-to-peer architecture, the terminals in a client-server architecture may be relatively simpler. For example, the terminals may simply be configured to capture video frames, compress the frames, and transmit compressed bitstreams. On another end, the server may be configured to receive compressed bitstreams from each terminal, produce video display signals, and transmit the display signals back to the terminals. The video display signal from the server may be some conversion of the original video signals. It should be noted that the video communication system 600 may also include other modules, such as transmitters, receivers, and video projectors. The video communication system 600 is but one example of video systems.

As mentioned above, in an embodiment, the encoder 630 may be used to perform a 2D DCT on the boundary blocks of the video object 650. Certain mathematical properties of the DCT may be used generate zero coefficients with known positions. For a considered boundary block, such as the boundary block 530 in FIG. 5, the present disclosure may use a padding method to assign certain values to the masked pixels, as well as rearrange the locations of the masked and unmasked pixels. The disclosed padding method may be applied on a boundary block of any suitable size. Suppose, for the purpose of illustration, that a boundary block being padded has a size of 4×4. Since a 2D DCT may be separable, two four-point 1D DCT operations may be performed on the boundary block (e.g., first on rows and then on columns) to produce a 4×4 DCT block. The two four-point 1D DCT operations may be equivalent (except that they are executed only different directions), thus they may also be referred to simply as a 1D DCT.

In an embodiment of a disclosed padding method, before performing a four-pint 1D DCT on a considered row (or column) of the boundary block, the number of masked pixels (denoted as $N_{mp}$), which may range from 0 to 4, in the row (or column) may be examined first. For this purpose, a binary mask corresponding to the video object may be used, since each row (or column) of the boundary block may have a corresponding row (or column) in a block of the binary mask. For example, if the binary mask comprises 1s and 1s to indicate unmasked and masked pixels in its corresponding video object, the number of 0s in the row of the block on the binary mask may be counted. This number may be the number of masked pixels in the row (or column) of the boundary block.

Depending on the number of masked pixels, a suitable padding scheme may be employed in order to generate zero coefficients with known positions. In an embodiment, when $N_{mp}=4$ (i.e., all pixels are masked pixels), all pixel values may be set to zero, thus the 1D DCT may generate four zero coefficients. When $N_{mp}=3$, the three masked pixels may be set to have the same value with the one unmasked pixel. Consequently, after performing the 1D DCT, the first coefficient may be non-zero and the remaining three coefficients may be zero.

When $N_{mp}=2$, the row (or column) comprises two masked pixels and two unmasked pixels. In this case, an even sequence may be created before performing the 1D DCT. Herein, an even sequence may refer to a sequence of values symmetric about a middle point. For example, a four-point even sequence with four values denoted as $P(j)$, where j is a location index (j=0, 1, 2, 3), may satisfy $P(0)=P(3)$ and $P(1)=P(2)$. Mathematically, in a four-pixel row, two unmasked pixels may occupy a total of six possible combinations of locations, and an even sequence may be created in each of the six cases. An embodiment of an padding scheme is illustrated in Table 1, where the two unmasked pixels are denoted with two values out of a, b, c, d, and the two masked pixels are denoted with a value x. It should be noted that some or all of the values a, b, c, d may be equal or unequal. Table 1 comprises a first column showing original pixel values in a row (or column), a second column showing rearrangement of pixel locations, and a third column showing pixel values after assigning suitable values to pixels.

TABLE 1

A padding scheme to generate an even sequence when a four-pixel row (or column) comprises two masked pixels and two unmasked pixel ($N_{mp}=2$)

| Original pixels | Location rearrangement | Value assignment |
| --- | --- | --- |
| a b x x | | a b b a |
| a x c x | | a c c a |
| a x x d | x a x d | d a a d |
| | a d x x | a d d a |
| | a x d x | a d d a |
| | x x a d | d a a d |
| x b c x | b x c x | b c c b |
| | c b x x | c b b c |
| | x b x c | c b b c |
| | x x c b | b c c b |
| x b x d | | d b b d |
| x x c d | | d c c d |

Since the exact locations of masked pixels in the row may be determined based on the binary mask, each of the six possible cases may be pre-configured with a case code, which may help the decoding and reconstruction of the boundary block later (in the decoder). In four of the six possible cases, an even sequence may be created by simply the values of the masked pixels to equal the values of the two unmasked pixels. However, there may be two of the six possible cases where it is impossible to create an even sequence by simply assigning values to the masked pixels. In these two cases, either one of the two unmasked pixels may be swapped with either one of the two masked pixels. For each of the two cases, there may be a total of four swapping possibilities, as shown in Table 1. After swapping, the values of the masked pixels may be assigned to equal the values of the two unmasked pixels, and then an even sequence may be created. Thus, in all six possible cases, the disclosed padding method may generate zero coefficients at the second and fourth positions of the 1D DCT array.

When $M_{mp}=1$, the row (or column) comprises one masked pixels and three unmasked pixels, denote with values x0, x1, and x2. In this case, the padding scheme may assign to the only masked pixel a value, denoted as x3, so that an equation x0−x1−x2+x3=0 is satisfied. After assigning value to the only masked pixel, regardless of its location in the row (or column), the generated DCT array may always have a zero coefficient in the third position. Finally, when $N_{mp}=0$, no masked pixel is contained, therefore all four DCT coefficients may be non-zero coefficients. In this case, no value assignment or location rearrangement may be performed, and a standard 1D DCT may be carried out.

Since the 2D DCT is separable, the padding scheme outlined above may be applied one more time in an orthogonal direction to the coefficient matrix produced by the first 1D DCT. Now, the positions of masked pixels may be the known positions of the zero coefficients generated in the original direction. As a result of the two consecutive 1D DCT operations, zero coefficients with known positions may be generated in the DCT block. The number of zero coefficients in the DCT block may be equal to the number of masked pixels in the boundary block. In comparison with the conventional DCT discussed previously, the disclosed padding scheme may generate more zero coefficients.

In an embodiment, an 8×8 boundary block may be padded with a scheme similar to that of the 4×4 block outlined above. Via assigning values to masked pixels and/or rearranging locations of pixels, a number of zero coefficients may be generated in the 8×8 DCT block that may equal the number of masked pixels in the 8×8 boundary block. In this case, two eight-point 1D DCTs may be performed on the boundary block in orthogonal directions. A standard unitary type-II DCT may be used, with x0, x1, . . . , x7 referring to pixel values and X0, X1, . . . , X7 referring to DCT coefficients. The DCT may be implemented in the forward direction by multiplying the following matrix (which may be multiplied by 1/sqrt(2)) by a vector of pixel values, which may be padded:

| C0 | C0 | C0 | C0 | C0 | C0 | C0 | C0 |
|----|----|----|----|----|----|----|----|
| C1 | C3 | C5 | C7 | −C7 | −C5 | −C3 | −C1 |
| C2 | C6 | −C6 | −C2 | −C2 | −C6 | C6 | C2 |
| C3 | −C7 | −C1 | −C5 | C5 | C1 | C7 | −C3 |
| C4 | −C4 | −C4 | C4 | C4 | −C4 | −C4 | C4 |
| C5 | −C1 | C7 | C3 | −C3 | −C7 | −C1 | −C5 |
| C6 | −C2 | C2 | −C6 | −C6 | C2 | −C2 | C6 |
| C7 | −C5 | C3 | −C1 | C1 | −C3 | C5 | −C7 | where matrix coefficients may be C0=1/2, and Cx=cos(pi*x/16), x=1, 2, . . . ,7. The matrix may be referred to as an eight-point DCT matrix.

Depending on the number of masked pixels (herein denoted by $M_{mp}$)) in a row (or column) of the 8×8 boundary block, which may range from 0 to 8, a suitable padding scheme may be used. In an embodiment, when $M_{mp}=0$, all pixels are unmasked pixels, thus no padding scheme may be applied. When $M_{mp}=1$, the only masked pixel may be set or assigned a value so that an equation: x0−x1−x2+x3+x4−x5−x6+x7=0 may be satisfied, where the value of the masked pixel may be any of the variables in the equation. Consequently, after performing the 1D DCT, the fifth coefficient (i.e., X4) may be zero.

When $M_{mp}=2$, the row (or column) comprises two masked pixels and six unmasked pixels. The two masked pixels may occupy a total of 28 possible combinations of locations. In some cases, one masked pixel may occupy one of the first, fourth, fifth and eighth (i.e., X0, X3, X4, and X7) locations, and the other masked pixel may occupy one of the second, third, fourth and seventh (i.e., X1, X2, X5, and X6) locations. In other cases, there may need to be a rearrangement or swap of an unmasked with a masked pixel, so that the two masked pixels may respectively occupy the above locations. Further, the two masked pixels may be assigned with values so that the following two equations may be satisfied.

$$-x1+x2+x5-x6=0$$

$$-x0-x3-x4+x7=0$$

After execution of value assignment and/or swapping, zero coefficients may be generated at the third and seventh locations (i.e., X2 and X6) of the eight-point DCT matrix.

When $M_{mp}=3$, the row (or column) comprises three masked pixels and five unmasked pixels. The three masked pixels may occupy a total of 56 possible combinations of locations. The padding scheme may be similar to that of $M_{mp}=2$. In some cases, at least one masked pixel may occupy one of the first, fourth, fifth and eighth (i.e., X0, X3, X4, and X7) locations, and at least one masked pixel may occupy one of the second, third, fourth and seventh (i.e., X1, X2, X5, and X6) locations. In other cases, there may need to be one or more swaps of an unmasked pixel with a masked pixel, so that the locations of the masked pixels may satisfy the above conditions. Further, the three masked pixels may be assigned with values so that the following three equations may be satisfied:

$$x0-x1-x2+x3+x4-x5-x6+x7=0$$

$$-x1+x2+x5-x6=0$$

$$-x0-x3-x4+x7=0$$

The above three equations may be equivalent to equations: x0+x7=x1+x6=x2+x5=x3+x4. Consequently, to warrant valid solutions for these equations, any two of the three masked pixels may not occupy pairs of locations {first, eighth}, {second, seventh}, {third, sixth}, and {fourth, fifth} (or with location indexes of {0, 7}, {1, 6}, {2, 5}, or {3, 4}). If this condition may not be satisfied, then further swap of one or more masked pixels with one or more unmasked pixel may be conducted. It should be noted that the conditions set above may not be broken during further swap of pixels. After execution of value assignment and/or swapping, zero coefficients may be generated at the third, fifth, and seventh locations (i.e., X2, X4 and X6) of the eight-point DCT matrix.

When $M_{mp}=4$, the row (or column) comprises four masked pixels and four unmasked pixels. In this case, the pixels may be arranged into one eight-point even sequence that is symmetric about the middle point (between the fourth and fifth pixel), such as the following eight-point sequence, where a, b, c, d are pixel values.

| a | b | c | d | d | c | b | a |
|---|---|---|---|---|---|---|---|

In an eight-pixel row (or column), four masked pixels may occupy a total of 70 possible combinations of locations, and an eight-point even sequence may be created in each of the 70 cases. In some cases, two even sequences may be created by simply assigning values to the masked pixels. In other cases, when an eight-point even sequence may not be generated by assigning pixel values, then one or two unmasked pixels may need to be swapped with one or two masked pixels. The pixels being swapped may have a distance of two within the even sequence. This swapping technique may be similar to the two-masked pixel case for the four-point DCT (shown in Table 1), except that the even sequence comprises eight pixels. After execution of value assignment and/or swapping, zero coefficients may be generated at the second, fourth, six, and eighth locations (i.e., X1, X3, X5, and X7) of the eight-point DCT matrix.

When $N_{mp}=5$, the row (or column) comprises five masked pixels and three unmasked pixels. The five masked pixels may occupy a total of 56 possible combinations of locations, and an eight-point even sequence may be created in each of the 56 cases. In this case, the padding scheme may be similar to the case with $M_{mp}=4$, except that one of the pixels a, b, c, d above is a masked pixel. This extra masked pixel may be assigned a value to satisfy the equation: x0−x1−x2+x3=0. This value assignment scheme may be similar to the one-masked pixel case discussed regarding the four-point DCT matrix. After assigning this extra masked pixel, as well as the other four masked pixels, an eight-point even sequence may be created. Thus, after performing the 1D DCT, zero coefficients may be generated at the second, fourth, fifth, sixth and eighth locations (i.e., X1, X3, X4, X5, and X7) of the eight-point DCT matrix.

When $M_{mp}=6$, the row (or column) comprises six masked pixels and two unmasked pixels. In this case, the pixels may be arranged into an eight-point sequence comprising two four-point even sequences, such as the following eight-point sequence, where a and b are pixel values.

| a | b | b | a | a | b | b | a |
|---|---|---|---|---|---|---|---|

Mathematically, in an eight-pixel row (or column), six masked pixels may occupy a total of 28 possible combinations of locations, and two four-point even sequences may be created in each of the 28 cases. In some cases, two even sequences may be created by simply assigning values to the masked pixels. In other cases, when two even sequences may not be generated by assigning pixel values, there may need to be a rearrangement or swap of an unmasked and a masked pixel. This swapping technique may be similar to the two-masked pixel case for the four-point DCT (shown in Table 1), except that the same process may be replicated for the second set of four pixels. After execution of value assignment and/or swapping, zero coefficients may be generated at the second, third, fourth, six, seventh and eighth locations (i.e., X1, X2, X3, X5, X6, and X7) of the eight-point DCT matrix.

When $M_{mp}=7$, the seven masked pixels may be set to have the same value with the one unmasked pixel. Consequently, after performing the 1D DCT, the first coefficient (i.e., X0) may be non-zero and the remaining seven coefficients (i.e., X1 through X7) may be zero. When $M_{mp}=8$ (i.e., all pixels are masked pixels), all pixel values may be set to zero, and the 1D DCT may generate eight zero coefficients.

In use, the padding scheme outlined above may be applied one more time in an orthogonal direction to the coefficient matrix produced by the first 1D DCT. Now, the positions of masked pixels may be the known positions of the zero coefficients generated in the original direction. As a result of the two consecutive 1D DCT operations, a number of zero coefficients in the DCT block may be equal to a number of masked pixels in the boundary block. It can be shown that, for an N×N boundary block with K masked pixels, where N is an integer greater than 1 and K is an integer between 1 and N, an embodiment of a padding scheme may be applied on the boundary block to yield a N×N DCT block with K zero coefficients. See, for example, Theorem 2 discussed on Page 69 of the article entitled "Arbitrarily Shaped Transform Coding Based on a New Padding Technique," by G. Shen, B. Zeng, and M. L. Liou in *IEEE Transactions on Circuits and Systems for Video Technology*, vol. 11, no. 1, pp. 67-78, 2001 (hereafter "the Shen article"), which is hereby incorporated by reference. By recognizing that the binary mask allows a decoder at a receiver may "undo" the padding schemes including the rearrangement of the N×N boundary block, the zero coefficients in the N×N DCT block may be skipped prior to compression of transform coefficients.

In fact, for an N×N boundary block with K masked pixels, where N is an integer greater than 1 and K is an integer between 1 and N, an embodiment of a padding scheme may be applied on the boundary block to yield a N×N transform block with K zero coefficients, for any discrete separable unitary transform (of which the 2D DCT is one example). This is primarily due to the invertibility of the matrix $C_{11}$ in the lower right corner of the matrix in Theorem 2 in the Shen article. All unitary transforms are invertible, and thus all of the rows are independent. Normal Gaussian elimination may begin with the upper left corner and works down the diagonal to solve the inverse. If a matrix A is invertible, then all square submatrices that start at the upper left corner (e.g. 1×1, 2×2, 3×3) are also invertible. See, for example, G. Strang, *Linear Algebra and Its Applications, Third Edition*, 1988, Harcourt Brace Jovanovich, page 236. While this may not apply directly to $C_{11}$, starting at the upper left corner and working downward is just convention, there is no reason that one cannot start at the lower left corner and eliminate upward. Using this procedure (a "backwards" Gaussian elimination so to speak) leads to determining that any $C_{11}$ matrix from a unitary transform will also be invertible. It follows that for an N×N boundary block with K masked pixels, where N is an integer greater than 1 and K is an integer between 1 and N, an embodiment of a padding scheme may be applied on the boundary block to yield a N×N transform block with K zero coefficients, for any discrete separable unitary transform.

The padding scheme of boundary blocks disclosed herein may generate zero DCT coefficients that are scattered throughout the DCT block, instead of clustering in the lower right corner. In this case, the conventional zigzag encoding order may have limited effectiveness, as only zero coefficients after the EOB position may be skipped. One or more zero coefficients before the EOB position, if existent, may still be encoded. Consequently, the degree of freedom and energy compaction may be limited. The current disclosure takes advantage of the fact that the positions of zero coefficients in the DCT block may be determined via a binary mask, and thus may skip all zero coefficients in the encoding and decoding processes. As a result of the zero-skip zigzag coding method, coding efficiency and energy compaction may be improved.

Figure 7:
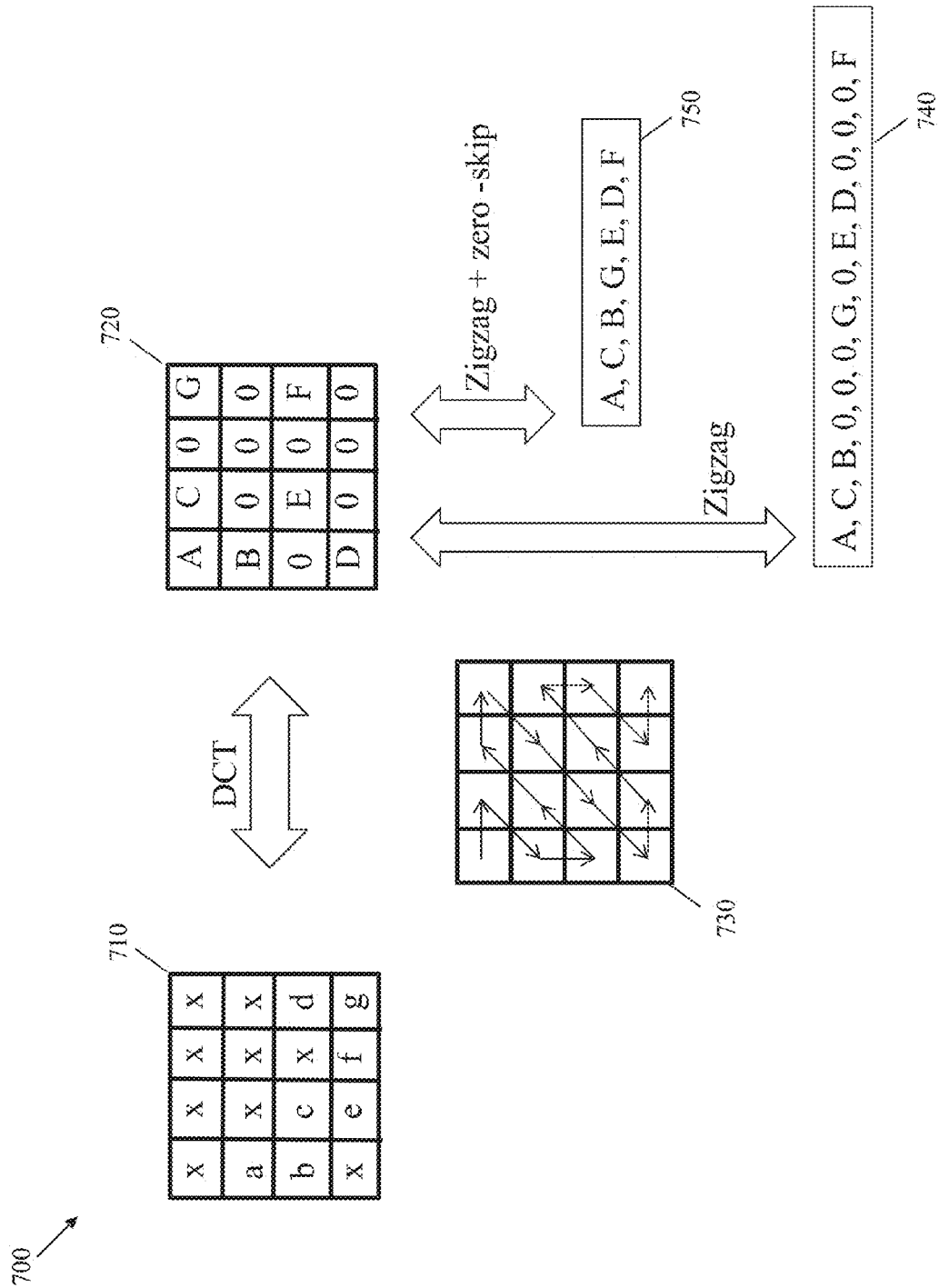
FIG. 7 is a schematic diagram of an embodiment of a zero-skip zigzag encoding scheme.

FIG. 7 shows a schematic diagram of an embodiment of a zero-skip zigzag encoding scheme 700. Any suitable size of block may be encoded in the zero-skip zigzag encoding scheme 700. For purpose of illustration, a 4×4 square block 710 is used as an example. The square block 710 may comprise one or more unmasked pixels (e.g., with color values of a, b, c, d, e, f, g arranged as in the block 710) and/or one or more masked pixels (e.g., 9 masked pixels whose values are denoted as x arranged as in the block 710). For example, the square block 710 may be a boundary block of a video object. A 2D DCT (or two orthogonal 1D DCTs) may be performed on the square block 700 to generate a DCT block 720. The DCT block 720 may comprise one or more non-zero coefficients (e.g., with values of A, B, C, D, E, F, G arranged as in the DCT block 720) and/or one or more zero coefficients (e.g., nine zero coefficients arranged as in the DCT block 720).

In an embodiment, the disclosed padding scheme may be applied to the block 710. Via assignment of values to the masked pixels and/or rearrangement of pixels, zero coefficients with known locations may be created in the DCT block 720. As illustrated in FIG. 7, the number of zero coefficients in the DCT block 720 may be equal to the number of masked pixels in the block 710. Alternatively, if additional quantization is operated on the DCT block 720, the number of zero coefficients in the DCT block 720 may be greater than the number of masked pixels in the block 710. Further, zero coefficients may be scattered throughout the DCT block 720 or skewed to one side or the other. All coefficients of the DCT block 720 may be pre-scanned following a pre-defined order, such as a zigzag order 730. An EOB symbol may be generated to signal the position of the last non-zero coefficient. For example, the position of F in the DCT block 720 may be identified as the EOB. Then, the same zigzag order 730 may be used in the encoding process. During encoding, the zigzag order 730 may generate a sequence (or array) of coefficients, which may in turn be encoded one-by-one.

For comparative purposes, two sequences of coefficients—one conventional sequence 740 and one zero-skip sequence 750 are shown in FIG. 7. The conventional sequence 740 may be generated by a conventional zigzag encoding order without zero-skip, thus the conventional sequence 740 comprise all coefficients, regardless of their values, before the EOB symbol. The conventional sequence 740 may not include coefficients after the EOB symbol. For example, the conventional sequence 740 may comprise coefficients (A, C, B, 0, 0, 0, G, 0, E, D, 0, 0, 0, F) out of the DCT block. In contrast, the zero-skip sequence 750 may be generated by a disclosed zero-skip zigzag encoding order, thus the zero-skip sequence 750 may skip all zero coefficients, regardless of their positions relative to the EOB symbol. For example, the zero-skip sequence 750 may include only non-zero coefficients (A, C, B, G, E, D, F) out of the DCT block 720. It may be seen, by comparison, that the number of coefficients in the zero-skip sequence 750 (seven coefficients) is significantly smaller than the number of coefficients in the conventional sequence 740 (fourteen coefficients). With the zero-skip capability provided by the present disclosure, the reduced number of encoded coefficients may lead to improvement of energy compaction properties.

Figure 8:
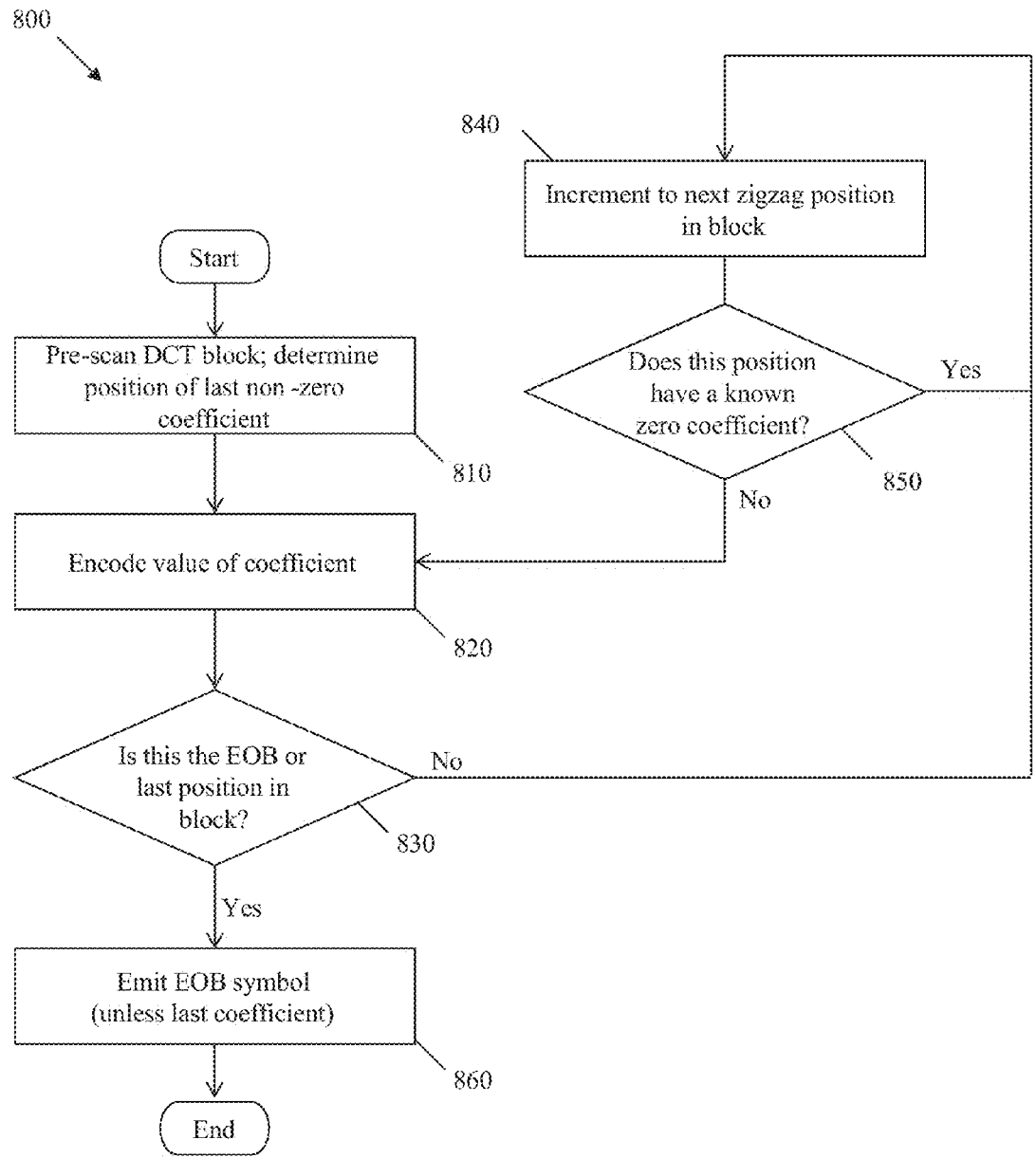
FIG. 8 is a flowchart of an embodiment of a zero-skip zigzag encoding method.

FIG. 8 shows a flowchart of an embodiment of a zero-skip zigzag encoding method 800. The method 800 may be implemented in an encoder (e.g., the encoder 630 in FIG. 6), which may receive a video object and a corresponding binary mask, and generate encoded video bitstreams. The method 800 may cover part of the encoding process in the encoder. The input of the method 800 may be a rectangular DCT block (e.g., N×N size) comprising a plurality of (e.g., $N^2$) frequency-domain coefficients. The DCT block may be generated from a boundary block of the video object using an embodiment of the disclosed padding method. The output of the method 800 may be a group of encoded DCT coefficients, which may comprise exclusively non-zero coefficients (less than $N^2$ in number).

The method 800 may start in step 810, where the DCT block may be pre-scanned in a zigzag order (e.g., the zigzag order 400 in FIG. 4). All coefficients may be pre-scanned to determine a position of the last non-zero coefficient, which may be signaled by an EOB symbol. If no zero coefficient exists in the DCT block, no EOB symbol may be needed. Next, in step 820, the value of a DCT coefficient at a current position may be encoded into a compressed format. Generally, the step 820 may start from position (0, 0)—the first position according to the zigzag order. Next, in step 830, the method 800 may determine whether the current coefficient being encoded is the EOB or last position (N−1, N−1) in the DCT block. If the condition in the block 830 is met, the method 800 may proceed to step 860. Otherwise, the method 800 may proceed to step 840. In step 840, the encoding may be incremented from the current position to a next position according to the zigzag order.

After the increment of position, in step 850, the method 800 may determine whether the new current position has a known zero coefficient. In an embodiment, the positions of all zero coefficients in the DCT block may be made known by using a padding method outlined above. Briefly, the corresponding binary mask may be used to determine the number of masked pixels in each row (or column) of the boundary block, which may then determine a pre-defined padding scheme. Following the padding scheme, masked pixels may be assigned with suitable values, and locations of masked and unmasked pixels may be rearranged. Accordingly, after performing two orthogonal 1D DCT operations, zero coefficients may be generated at known positions of the DCT block, which may be checked in step 850. If the condition in the block 850 is met, the method 800 may return to step 840 to further increment the encoding position to a next zigzag position. Otherwise, the method 800 may return to step 820 to encode the value of coefficient at the current position. Eventually, after the last non-zero coefficient has been encoded (i.e., meeting the condition of the block 830), in step 860, an EOB symbol may be emitted in the encoder, signaling the end of the method 800. Alternatively, if the last non-zero coefficient is actually the last coefficient of the DCT block at position (N−1, N−1), the method 800 may simply end without emitting the EOB symbol. The method 800 may produce a group of encoded coefficients, which may be stored in a memory unit, or transmitted as a bitstream over a network and received by a decoder.

Figure 9:
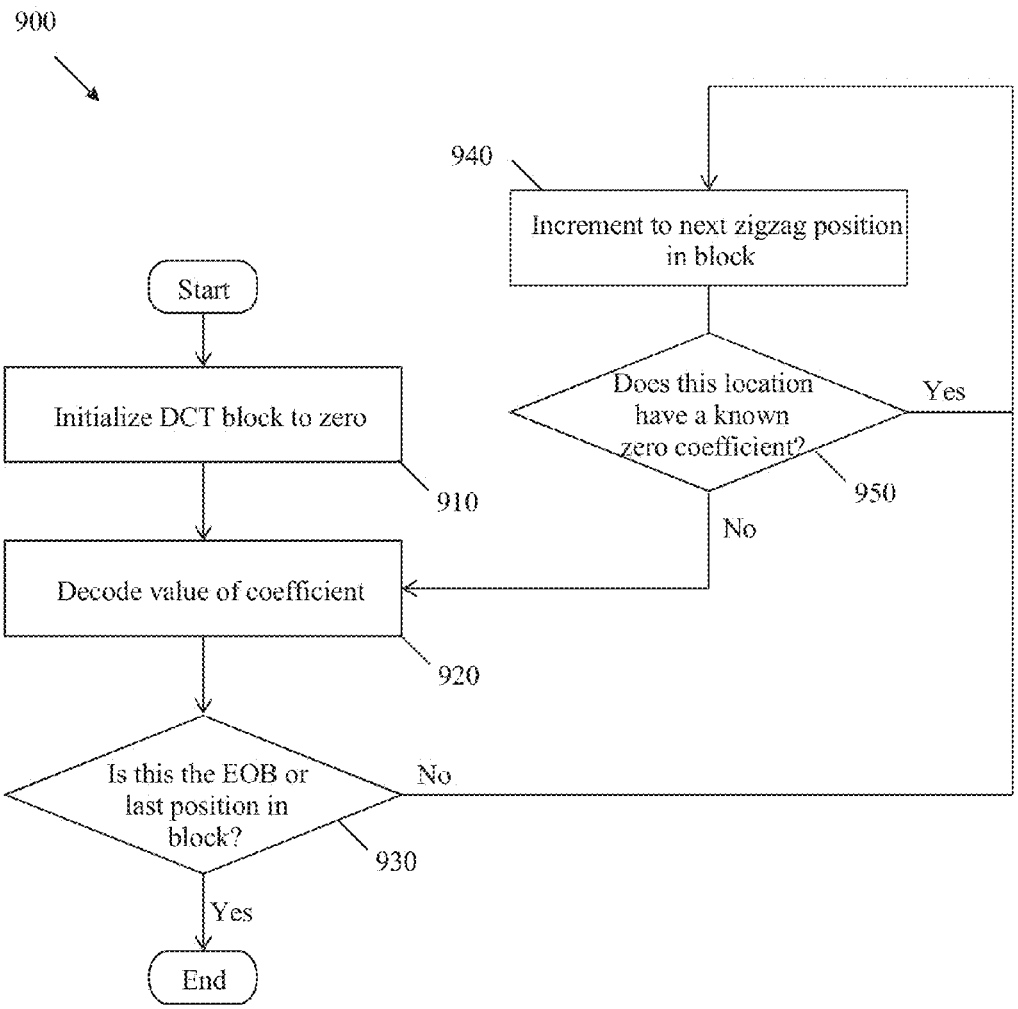
FIG. 9 is a flowchart of an embodiment of a zero-skip zigzag decoding method.

FIG. 9 shows a flowchart of an embodiment of a zero-skip zigzag decoding method 900 corresponding to the zero-skip zigzag encoding method 800. The method 900 may be implemented in a decoder (e.g., the decoder 635 in FIG. 6), which may receive compressed bitstreams comprising a video object and a corresponding binary mask, and generate an uncompressed video object. The method 900 may cover part of the decoding process in the decoder. The input of the method 900 may be a group of compressed DCT coefficients, which may comprise exclusively non-zero coefficients (e.g., less than $N^2$ in number). The output of the method 900 may be a rectangular DCT block (e.g., N×N size) comprising a plurality of (e.g., $N^2$) uncompressed coefficients. The rectangular DCT block may be used to reconstruct a boundary block of the video object.

The method 900 may start in step 910, where the output DCT block may be initialized to have uncompressed zero coefficients in all $N^2$ positions. Next, in step 920, a compressed coefficient in the received group may be decoded into an uncompressed format. The group of compressed DCT coefficients may be decoded one-by-one following a linear order (e.g., from group head to end). The uncompressed non-zero coefficient may be filled into a current position (to replace a zero coefficient) in the DCT block according to a zigzag order. In use, the uncompressed coefficient may be filled into the DCT block starting from position (0, 0)—the first position according to the zigzag order. Next, in step 930, the method 900 may determine whether the current position being filled is the EOB or last position (N−1, N−1) of the DCT block. The EOB signal may be received from an encoder and included in the compressed coefficient group. If the condition in the block 930 is met, the method 900 may end. Otherwise, the method 900 may proceed to step 940. In step 940, the filling position may be incremented from the current position to a next position according to the zigzag order.

After the increment of position, in step 950, the method 900 may determine whether the new current position is a known position of zero coefficient. In an embodiment, the positions of all zero coefficients in the decoded DCT block may be determined by the decoder, which may also receive and decode a compressed binary mask corresponding to the video object. Similar to the use of the binary mask in an encoder, the binary mask may be used in the decoder to determine the number of masked pixels in each row (or column) of the boundary block to be reconstructed. Since, according to the disclosed padding scheme, the number of masked pixels may determine the number as well as positions of zero coefficients, the distribution of zero coefficients to include in the uncompressed DCT block may be known by the decoder. If the condition in the block 950 is met, the method 900 may return to step 940 to increment the filling position to a next zigzag position. Otherwise, the method 900 may return to step 920 to decode a next compressed non-zero coefficient in the received group. The uncompressed coefficient may be filled at the new current position of the DCT block. Eventually, after the EOB position or the last coefficient in the uncompressed DCT block has been reached (i.e., meeting the condition of the block 830), the method 900 may end.

The uncompressed DCT block generated by the method 900 may comprise $N^2$ coefficients including zero coefficients at known positions. In order to reconstruct the boundary block from the uncompressed DCT block, an IDCT may be performed to transform all frequency-domain coefficients to spatial-domain pixel values. It should be noted that, similar to a 2D DCT, a 2D IDCT may also be separated into two 1D IDCT operations performed in orthogonal directions. A 1D IDCT may be performed first on all rows and then on the columns of a DCT block to recover pixel values. Since the locations of unmasked pixels may have been rearranged during DCT, according to the disclosed padding scheme, the binary mask may need to be used again after the IDCT to retrieve unmasked pixels to their original locations for correct video display.

Consider, for example, the reconstruction of a boundary block with a size of 4×4. The number of masked pixels ($N_{mp}$) on a considered row (or column) of the boundary block may be indicated by binary data points in a corresponding row of a 4×4 block on the binary mask. Depending on the value of $N_{mp}$, a suitable reconstruction scheme may be applied. For example, when $N_{mp}=2$, the two unmasked pixels may take a total of six possible combinations of locations. Further, since the exact locations of masked pixels in the row may be known from the binary mask, each of the six possible cases may have a pre-configured case code in the decoder, which may be the same with the case code pre-configured in the encoder. Depending on the case code, in two out of the six cases, the location of an unmasked pixel may need to be swapped with the location of a masked pixel. Similarly, when $N_{mp}$ has a different value, a different reconstruction scheme may be implemented. In an arbitrary shape transform coding system, all masked pixels may actually be removed from the reconstructed boundary block, since their values were only assigned so that a 2D transform may be conducted on the original boundary block. Without the arbitrarily assigned values of the masked pixels, the unmasked pixels may be correctly displayed in the boundary block. Thus, the video object as a whole may also be correctly displayed.

As shown in FIG. 8 and FIG. 9, the zero-skip zigzag encoding and decoding methods disclosed herein may include a checking step (e.g., step 850 in FIG. 8, or step 950 in FIG. 9) to account for the known locations of zero coefficients in a DCT block, which may not be included in conventional zigzag coding methods. This checking step may not require any extra information to be sent to an encoder and/or a decoder other than the already available binary mask. The disclosed methods may remove the restriction in conventional zigzag coding methods that zero coefficients can only occur in the high-index coefficients or after the EOB position. As a result, the values of masked pixels in a boundary block may be assigned (or chosen) with much greater freedom, which may lead to better energy compaction properties. In addition, there may be no issue with zero coefficients being scattered or skewed to one side or the other of the DCT block and affecting the effectiveness of the zigzag encoding order. In the disclosed methods, all zero coefficients, regardless of their position in the DCT block, may be effectively skipped in encoding and decoding processes.

Figure 10:
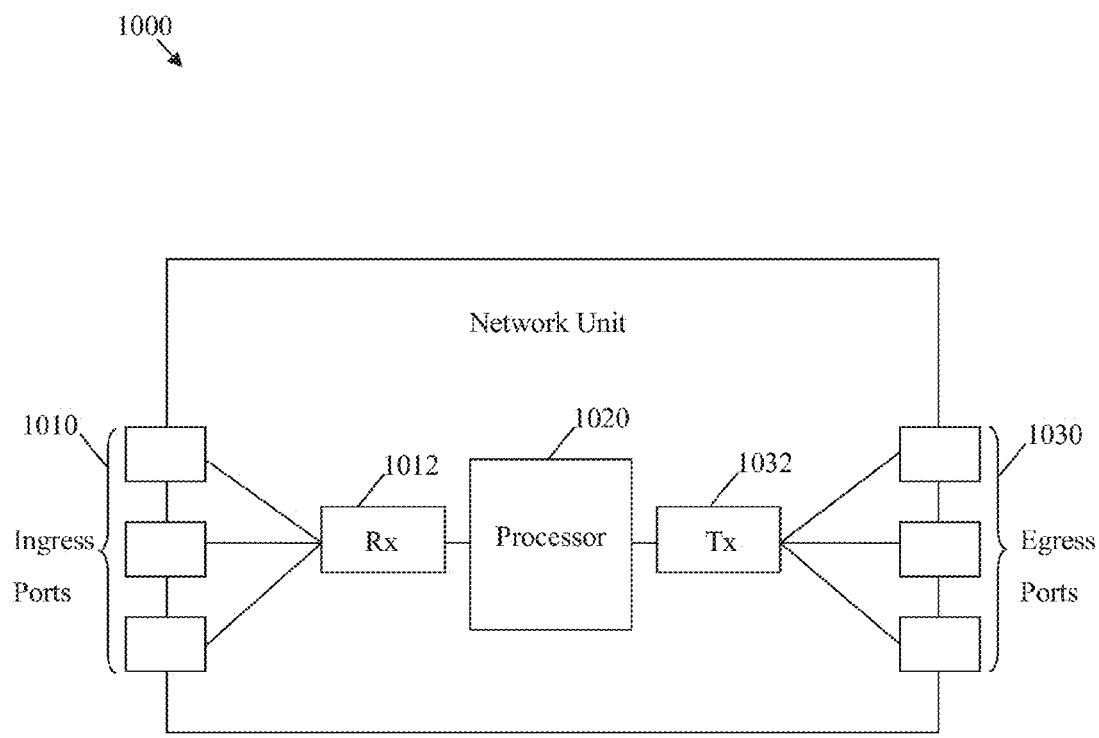
FIG. 10 is a schematic diagram of an embodiment of a network unit.

FIG. 10 illustrates an embodiment of a network unit 1000, which may comprise a processor or an encoder as described above (e.g., the encoder 630 in FIG. 6) within a network or system. The network unit 1000 may comprise a plurality of ingress ports 1010 and/or receiver units (Rx) 1012 for receiving data, processor or logic unit 1020 to process signals and determine where to send the data to, and a plurality of egress ports 1030 and/or transmitter units (Tx) 1032 for transmitting data to other systems. The processor or logic unit 1020 may be configured to implement any of the schemes described herein, such as the zero-skip zigzag encoding method 800, and may be implemented using hardware, software, or both.

Figure 11:
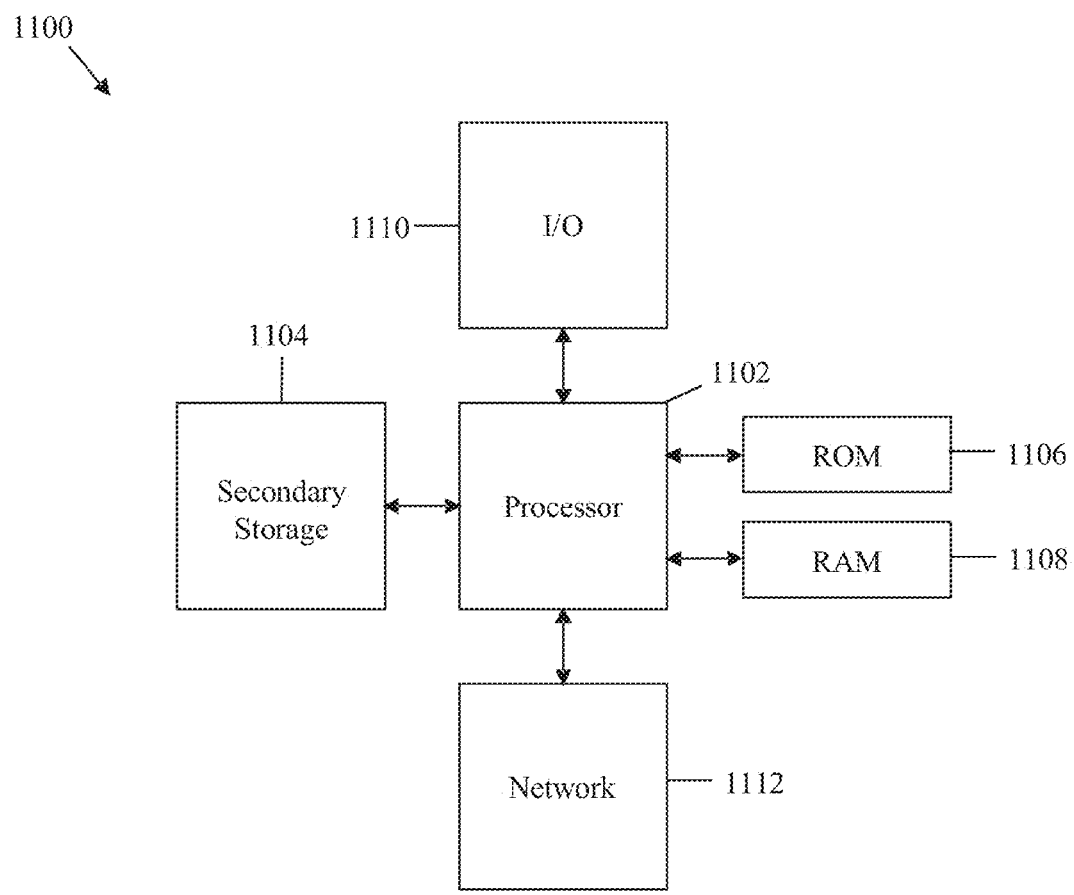
FIG. 11 is a schematic diagram of a typical, general-purpose computer system.

The schemes described above may be implemented on any general-purpose network component, such as a computer or network component with sufficient processing power, memory resources, and network throughput capability to handle the necessary workload placed upon it. FIG. 11 illustrates a typical, general-purpose network component or computer system 1100 suitable for implementing one or more embodiments of the methods disclosed herein, such as the zero-skip zigzag encoding method 800 and the zero-skip zigzag decoding method 900. The general-purpose network component or computer system 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1102 may be programmed or configured to implement any of the schemes described herein, including the zero-skip zigzag encoding method 800 and the zero-skip zigzag decoding method 900, which may be implemented using hardware, software, or both.

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
  a memory;
  a processor coupled to the memory and configured to:
    extract a video object having an arbitrary shape from an image and then divide the video object into blocks;
    generate a rectangular block of transform coefficients comprising applying a discrete separable unitary transform to a rectangular boundary block of the video object as extracted and divided, wherein the transform coefficients comprise a number of zero-valued transform coefficients greater than or equal to a number of masked pixels, and wherein the transform coefficients comprise at least one non-zero-valued transform coefficient; and
    generate an encoded output comprising compressing only the non-zero-valued transform coefficients,
  wherein a number of non-zero-valued transform coefficients is equal to a number of unmasked pixels in the boundary block, and wherein a number of zero-valued transform coefficients is equal to a number of masked pixels in the boundary block,
  wherein the boundary block has a symmetric size, wherein each pixel in the boundary block is either a masked pixel or an unmasked pixel, wherein each set of pixels is a row or a column of the boundary block, wherein each set of pixels comprises sequentially pixels at a first, a second, a third, and a fourth locations, wherein, when a set comprises two masked pixels and two unmasked pixels, the processor is further configured to:
    rearrange the set and assign two values to the two masked pixels such that an even sequence is created and generate two non-zero transform coefficients based on the even sequence when the two masked pixels are at the first and the fourth locations or at the second and third locations; and
    assign two values to the two masked pixels such that an even sequence is created and generate two non-zero transform coefficients based on the even sequence when the two masked pixels are at the first and the second locations, or at the first and the third locations, or at the second and the fourth locations, or at the third and fourth locations.

2. The apparatus of claim 1, wherein the discrete separable unitary transform is a Discrete Cosine Transform (DCT).

3. The apparatus of claim 1, wherein a position of at least one zero-valued coefficient in the rectangular block of transform coefficients is determined based on a binary mask corresponding to the video object.

4. The apparatus of claim 2, wherein the non-zero-valued transform coefficients are read out of the rectangular block of transform coefficients in a pre-defined order to create a sequence of non-zero-valued transform coefficients prior to compression.

5. The apparatus of claim 4, wherein the zero-valued coefficients are skipped during the reading out of the rectangular block of transform coefficients.

6. The apparatus of claim 5, wherein, for each row or column of the boundary block, the processor is further configured to:
assign values to the masked pixels or rearrange the row or column and assign values to the masked pixels when the row or column comprises a number of masked pixels at pre-defined locations; and
generate a number of non-zero-valued DCT coefficients that is less than or equal to the number of unmasked pixels in the row or column a by performing a 1D DCT on the row or column, wherein the remaining DCT coefficients are zero-valued.

7. The apparatus of claim 6, wherein the rectangular boundary block has a size of 4×4, and wherein the rectangular block of transform coefficients has a size of 4×4.

8. The apparatus of claim 6, wherein the rectangular boundary block has a size of 8×8, and wherein the rectangular block of transform coefficients has a size of 8×8.

9. The apparatus of claim 1, wherein the number of zero-valued transform coefficients is greater than or equal to the number of masked pixels.

10. A method comprising:
extracting, by a processor, a video object having an arbitrary shape from an image and dividing the video object into blocks;
generating, by the processor, a rectangular block of transform coefficients comprising applying a discrete separable unitary transform to a rectangular boundary block of the video object as extracted and divided, wherein the transform coefficients comprise a number of zero-valued transform coefficients greater than or equal to a number of masked pixels, and wherein the transform coefficients comprise at least one non-zero-valued transform coefficient; and
generating an encoded output comprising compressing only the non-zero-valued transform coefficients,
wherein a number of non-zero-valued transform coefficients is equal to a number of unmasked pixels in the boundary block, and wherein a number of zero-valued transform coefficients is equal to a number of masked pixels in the boundary block,
wherein the boundary block has a size of 4×4, wherein each pixel in the boundary block is either a masked pixel or an unmasked pixel, wherein each set of pixels is a row or a column of the boundary block, wherein each set of pixels comprises sequentially four pixels at a first, a second, a third, and a fourth locations, wherein, when a set comprises two masked pixels and two unmasked pixels, the method further comprises:
rearranging, by the processor, the set and assign two values to the two masked pixels such that an even sequence is created and generate two non-zero transform coefficients based on the even sequence when the two masked pixels are at the first and the fourth locations or at the second and third locations; and
assigning, by the processor, two values to the two masked pixels such that an even sequence is created and generate two non-zero transform coefficients based on the even sequence when the two masked pixels are at the first and the second locations, or at the first and the third locations, or at the second and the fourth locations, or at the third and fourth locations.

11. The method of claim 10, wherein the discrete separable unitary transform is a Discrete Cosine Transform (DCT).

12. The method of claim 10, wherein a position of at least one zero-valued coefficient in the rectangular block of transform coefficients is determined based on a binary mask corresponding to the video object.

13. The method of claim 11, wherein the non-zero-valued transform coefficients are read out of the rectangular block of transform coefficients in a pre-defined order to create a sequence of non-zero-valued transform coefficients prior to compression.

14. The method of claim 13, wherein the zero-valued coefficients are skipped during the reading out of the rectangular block of transform coefficients.

15. The method of claim 14 further comprising, for each row or column of the boundary block,
assigning values to the masked pixels or rearranging the row or column and assigning values to the masked pixels when the row or column comprises a number of masked pixels at pre-defined locations; and
generating a number of non-zero-valued DCT coefficients that is less than or equal to the number of unmasked pixels in the row or column a by performing a 1D DCT on the row or column, wherein the remaining DCT coefficients are zero-valued.

16. The method of claim 15, wherein the rectangular boundary block has a size of 4×4, and wherein the rectangular block of transform coefficients has a size of 4×4.

17. The method of claim 15, wherein the rectangular boundary block has a size of 8×8, and wherein the rectangular block of transform coefficients has a size of 8×8.

18. The method of claim 10, wherein the number of zero-valued transform coefficients is greater than or equal to the number of masked pixels.

19. An apparatus for encoding a rectangular boundary block of a video object, wherein the boundary block comprises a plurality of pixels, wherein at least one pixel is a masked pixel and at least one pixel is an unmasked pixel, the apparatus comprising:
a processor configured, for each of a plurality of sets of pixels of the boundary block, to:
assign a discrete cosine transform (DCT) coefficient a value of zero when the masked and unmasked pixels in a set are arranged in one of a plurality of predefined orders;
perform a one-dimensional (1D) DCT on the set to generate a non-zero-valued DCT coefficient when the masked and unmasked pixels in a set are not arranged in one of a plurality of predefined orders; and
generate an encoded output comprising compressing only the non-zero-valued DCT coefficients,
wherein a number of non-zero-valued DCT coefficients is equal to a number of unmasked pixels in the boundary block, and wherein a number of zero-valued DCT coefficients is equal to a number of masked pixels in the boundary block,
wherein the boundary block has a size of 4×4, wherein each pixel in the boundary block is either a masked pixel or an unmasked pixel, wherein each set of pixels in the plurality of sets is a row or a column of the boundary block, wherein each set of pixels comprises sequentially four pixels at a first, a second, a third, and a fourth locations, wherein, when a set comprises two masked pixels and two unmasked pixels, the processor is further configured to:
rearrange the set and assign two values to the two masked pixels such that an even sequence is created and generate two non-zero DCT coefficients by performing a 1D DCT on the even sequence when the two masked pixels are at the first and the fourth locations or at the second and third locations; and assign two values to the two masked pixels such that an even sequence is created and generate two non-zero DCT coefficients by performing a 1D DCT on the even sequence when the two masked pixels are at the first and the second locations, or at the first and the third locations, or at the second and the fourth locations, or at the third and fourth locations.

20. The apparatus of claim 19, wherein the processor is further configured to:
   assign the three masked pixels equal the value of the unmasked pixel when a set comprises three masked pixels and one unmasked pixel; and
   generate one non-zero DCT coefficient by performing a 1D DCT on the resulting pixel values.

21. The apparatus of claim 19, wherein the processor is further configured to:
   assign the masked pixel a value, denoted as $x3$, that satisfies the equation $x0-x1-x2+x3=0$ when a set comprises three unmasked pixels, denoted with values $x0$, $x1$, and $x2$, and one masked pixel, and
   generate three non-zero DCT coefficients by performing a 1D DCT on the resulting pixel values.

22. The apparatus of claim 19, wherein the boundary block has a size of 8×8, wherein each pixel in the boundary block is either a masked pixel or an unmasked pixel, wherein each set of pixels in the plurality of sets is a row or a column of the boundary block, wherein each set of pixels comprises sequentially eight pixels at a first, a second, a third, a fourth, a fifth, a sixth, a seventh, and an eighth locations, wherein the processor is further configured to:
   assign the masked pixel a value, denoted as $x7$, that satisfies the equation $x0-x1-x2+x3+x4-x5-x6+x7=0$ when a set comprises seven unmasked pixels, denoted with values $x0$, $x1$, $x2$, $x3$, $x4$, $x5$, $x6$, and one masked pixel, and
   generate seven non-zero DCT coefficients by performing a 1D DCT on the resulting pixel values.

23. The apparatus of claim 22, wherein, when a set comprises six unmasked pixels, denoted with values $x0$, $x1$, $x2$, $x3$, $x4$, and $x5$, and two masked pixels, the processor is further configured to:
   assign the two masked pixel two values, denoted as $x6$ and $x7$, that satisfy two equations $-x1+x2+x5-x6=0$ and $x0-x3-x4+x7=0$ when one masked pixel is at the first, fourth, fifth or eighth location, and the other masked pixel is at the second, third, fourth, or seventh location;
   generate six non-zero DCT coefficients by performing a 1D DCT on the resulting pixel values;
   rearrange the set such that one masked pixel is at the first, fourth, fifth or eighth location, and the other masked pixel is at the second, third, fourth, or seventh location when one masked pixel is not at the first, fourth, fifth or eighth location, and the other masked pixel is not at the second, third, fourth, or seventh location;
   assign the two masked pixel two values, denoted as $x6$ and $x7$, that satisfy two equations $-x1+x2+x5-x6=0$ and $x0-x3-x4+x7=0$ when one masked pixel is at the first, fourth, fifth or eighth location, and the other masked pixel is at the second, third, fourth, or seventh location; and
   generate six non-zero DCT coefficients by performing a 1D DCT on the resulting pixel values.

24. The apparatus of claim 23, wherein, when a set comprises five unmasked pixels, denoted with values $x0$, $x1$, $x2$, $x3$, and $x4$, and three masked pixels and at least one masked pixel is at the first, fourth, fifth and eighth location, at least one other masked pixel is at the second, third, fourth, or seventh location, and any two of the three masked pixels do not occupy any of location pairs {first, eighth}, {second, seventh}, {third, sixth}, and {fourth, fifth}, the processor is further configured to:
   assign the three masked pixel three values, denoted as $x5$, $x6$, and $x7$, that satisfy three equations $x0-x1-x2+x3+x4-x5-x6+x7=0$, $-x1+x2+x5-x6=0$, and $x0-x3-x4+x7=0$;
   generate five non-zero DCT coefficients by performing a 1D DCT on the resulting pixel values;
   rearrange the set such that at least one masked pixel is at the first, fourth, fifth and eighth location, at least one other masked pixel is at the second, third, fourth, or seventh location, and any two of the three masked pixels do not occupy any of location pairs {first, eighth}, {second, seventh}, {third, sixth}, and {fourth, fifth};
   assign the two masked pixel two values, denoted as $x6$ and $x7$, that satisfy two equations $-x1+x2+x5-x6=0$ and $x0-x3-x4+x7=0$; and
   generate five non-zero DCT coefficients by performing a 1D DCT on the resulting pixel values.

25. The apparatus of claim 24, wherein, when a set comprises four unmasked pixels and four masked pixels, the processor is further configured to:
   assign the four masked pixel four values such that an eight-pixel even sequence is created or rearrange the set and assign the four masked pixel four values such that an eight-pixel even sequence is created; and
   generate four non-zero DCT coefficients by performing a 1D DCT on the resulting pixel values.

26. The apparatus of claim 25, wherein, when a set comprises three unmasked pixels, denoted with values $x0$, $x1$, and $x2$, and five masked pixels, the processor is further configured to:
   assign three masked pixel values such that an even eight-pixel sequence is created, where the two remaining masked pixels are paired in a symmetric pattern or rearrange the set and assign three masked pixel values such that an even eight-pixel sequence is created, where the two remaining masked pixels are paired in a symmetric pattern;
   compute the value of the two remaining paired pixels as $x3$, such that $x3$ satisfies the equation: $x0-x1-x2+x3=0$; and
   generate three non-zero DCT coefficients by performing a 1D DCT on the resulting pixel values.

27. The apparatus of claim 25, wherein, when a set comprises two unmasked pixels and six masked pixels, the processor is further configured to:
   assign the six masked pixel six values such that two four-pixel even sequences are created or rearrange the set and assign the six masked pixel six values such that two four-pixel even sequences are created; and
   generate two non-zero DCT coefficients by performing a 1D DCT on the resulting pixel values.

28. The apparatus of claim 26, wherein, when a set comprises one unmasked pixel and seven masked pixel, the processor is further configured to assign the seven masked pixels equal the value of the unmasked pixel and generate one non-zero DCT coefficient by performing a 1D DCT on the resulting pixel values.

* * * * *